(No Model.)

H. M. LINDENTHAL.
EGG SHELF.

No. 276,612.        Patented May 1, 1883.

Witnesses:
Gust. Haas
Robt. C. Johnston

Inventor:
Hattie May Lindenthal

UNITED STATES PATENT OFFICE.

HATTIE MAY LINDENTHAL, OF SEWICKLEY, PENNSYLVANIA.

EGG-SHELF.

SPECIFICATION forming part of Letters Patent No. 276,612, dated May 1, 1883.

Application filed March 5, 1883. (No model.)

*To all whom it may concern:*

Be it known that I, HATTIE MAY LINDENTHAL, residing at Sewickley, in the county of Allegheny and State of Pennsylvania, have invented a new and useful Egg Shelf or Case, of which the following is a specification, reference being had to the accompanying drawings, in which—

Figure 1:
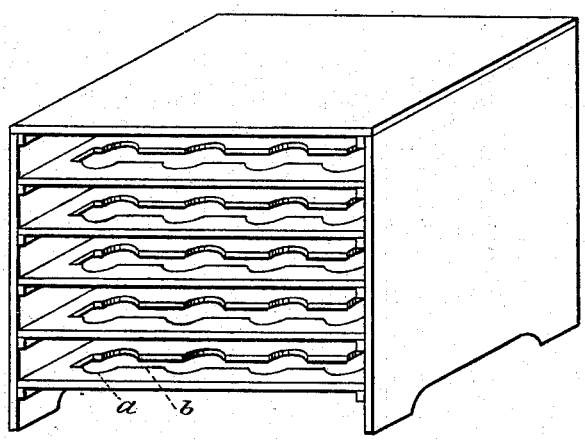
Figure 2:
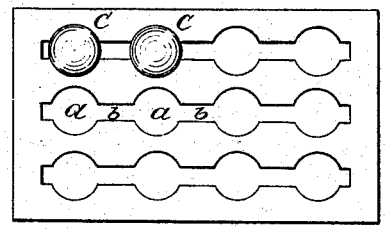

Figure 1 represents the shelves in an inclosing-case, and Fig. 2 a single shelf.

The object of my invention is to keep eggs in good condition for convenient use in housekeeping and during transportation.

The shelves are constructed of a solid piece of wood, having rectangular slots $b$, which are scalloped out at intervals on each side thereof, forming openings $a$ to hold the eggs in an endwise or upright position. The scallops may be made of different sizes, providing for difference in the sizes of the eggs.

I am aware that an egg-tray has been made with a bottom formed of parallel slats set apart from each other, and having in their opposing edges and at the upper side of those edges curved semi-seats for eggs.

What I claim is—

A diaphragm or shelf for cases, made of wood, and having holes and connecting-slots in its body, in contradistinction to separate opposed slats having curved semi-seats in their respective edges, as and for the purpose set forth.

HATTIE MAY LINDENTHAL.

Witnesses:
GUST. HAAS,
ROBT. C. JOHNSTON.